US011987052B2

(12) United States Patent
Graham et al.

(10) Patent No.: US 11,987,052 B2
(45) Date of Patent: May 21, 2024

(54) PHOTOIMAGEABLE NOZZLE PLATE HAVING INCREASED SOLVENT RESISTANCE

(71) Applicant: FUNAI ELECTRIC CO., LTD, Osaka (JP)

(72) Inventors: David C. Graham, Lexington, KY (US); Sean T. Weaver, Lexington, KY (US)

(73) Assignee: FUNAI ELECTRIC CO., LTD (JP)

( * ) Notice: Subject to any disclaimer, the term of this patent is extended or adjusted under 35 U.S.C. 154(b) by 169 days.

(21) Appl. No.: 17/662,861

(22) Filed: May 11, 2022

(65) Prior Publication Data

US 2023/0364908 A1 Nov. 16, 2023

(51) Int. Cl.
*B41J 2/14* (2006.01)
*B41J 2/145* (2006.01)
*B41J 2/16* (2006.01)
*B41J 2/175* (2006.01)

(52) U.S. Cl.
CPC ............ *B41J 2/1433* (2013.01); *B41J 2/145* (2013.01); *B41J 2/162* (2013.01); *B41J 2/175* (2013.01)

(58) Field of Classification Search
CPC . B41J 2/1433; B41J 2/145; B41J 2/162; B41J 2/175
See application file for complete search history.

(56) References Cited

U.S. PATENT DOCUMENTS

| | | | | |
|---|---|---|---|---|
| 5,167,776 | A | 12/1992 | Bhaskar et al. | |
| 7,153,459 | B2 | 12/2006 | Kitahara | |
| 7,441,868 | B2 | 10/2008 | Seto | |
| 10,328,692 | B2 | 6/2019 | Tomimatsu | |
| 10,569,544 | B2 | 2/2020 | Mcclelland | |
| 2004/0040929 | A1 * | 3/2004 | Kim | B41J 2/1631 216/27 |
| 2007/0076060 | A1 * | 4/2007 | Weaver | B41J 2/162 347/68 |

* cited by examiner

*Primary Examiner* — Jason S Uhlenhake
(74) *Attorney, Agent, or Firm* — Luedeka Neely, P.C.

(57) ABSTRACT

A nozzle plate of a fluid ejection head for a fluid ejection device, a fluid ejection head containing the nozzle plate, and a method for making the fluid ejection head containing the nozzle plate. The nozzle plate includes at least two arrays of nozzle holes on opposing sides of a fluid supply via etched in an ejection head substrate and a photoresist layer attached to an exposed surface of the nozzle plate spanning a section of the nozzle plate between the at least two arrays of nozzle holes. The photoresist layer increases a thickness of the nozzle plate between the at least two arrays of nozzle holes to greater than 25 microns up to about 100 microns.

16 Claims, 7 Drawing Sheets

PHOTOIMAGEABLE NOZZLE PLATE HAVING INCREASED SOLVENT RESISTANCE

TECHNICAL FIELD

The disclosure is directed to an improved photoimageable nozzle member for fluid ejection devices and methods and structures that provide nozzle plates having increased resistance to solvents.

BACKGROUND AND SUMMARY

As shown in FIGS. 1 and 2, a conventional fluid jet ejection head 10 has a plurality of nozzle holes 12*a* and 12*b* that are closely adjacent to one another. During a printing operation, fluid is fed from a fluid via 14 etched through an ejection head chip 16 to one or more flow channels 18 and associated fluid chambers 20 in a fluid flow layer 22 of the ejection head 10. A fluid ejector 24, such as a thin film resistor, may be used to heat fluid in the fluid chambers 20 and thereby cause fluid to be ejected through the nozzle holes 12 in a nozzle plate 26. FIG. 2 shows two arrays 28*a* and 28*b* of nozzle holes 12 and fluid ejectors 24. During fluid ejection, fluids containing solvents are in intimate contact with the nozzle plate 26.

Conventional photoimageable nozzle plates 26 for fluid jet ejection heads 10 used in dispense devices are often not compatible with all solvents used in the fluids dispensed by the fluid jet dispense devices. Many of the solvents used for such fluids are absorbed by the photoresist materials used to make the nozzle plates causing swelling of the photoresist materials. Swelling of the nozzle plates causes stresses that lead to bulging or deformation of the nozzle plate and in some cases delamination of the nozzle plates from underlying flow feature layers of the fluid jet ejection heads. Accordingly, what is needed is a fluid jet ejection head that is not susceptible to solvents that can cause bulging and delamination of components of the ejection head.

In view of the foregoing, an embodiment of the disclosure provides a nozzle plate of a fluid ejection head for a fluid ejection device. The nozzle plate includes at least two arrays of nozzle holes on opposing sides of a fluid supply via etched in an ejection head substrate and a photoresist layer attached to an exposed surface of the nozzle plate spanning a section of the nozzle plate between the at least two arrays of nozzle holes. The photoresist layer increases a thickness of the nozzle plate between the at least two arrays of nozzle holes to greater than 25 microns up to about 100 microns.

Another embodiment of the disclosure provides a method for making an improved fluid ejection head for fluid ejection device. The method includes applying a first negative photoresist layer to a device surface of a semiconductor substrate. The first negative photoresist layer is derived from a composition comprising a multi-functional epoxy compound, a first di-functional epoxy compound, a photoacid generator, an adhesion enhancer, and an aryl ketone solvent. The first negative photoresist layer is imaged and developed to provide a plurality of flow features therein. A second negative photoresist layer is applied to an exposed surface of the first photoresist layer. The second negative photoresist layer has a thickness ranging from about 10 to about 30 microns and is derived from a second photoresist formulation comprising a second di-functional epoxy compound, a relatively high molecular weight polyhydroxy ether, the photoacid generator, the adhesion enhancer, and an aliphatic ketone solvent. The second photoresist layer is imaged and developed to provide a nozzle plate having at least two arrays of nozzle holes therein on opposing sides of a fluid supply via etched through the semiconductor substrate. A third negative photoresist layer is applied to an exposed surface of the nozzle plate. The third negative photoresist layer is imaged and developed to provide a reinforcing member attached to the nozzle plate, wherein the reinforcing member spans a section of the nozzle plate between the at least two arrays of nozzle holes.

In some embodiments, the nozzle plate is made of a photoimageable layer.

In some embodiments, the third photoresist layer increases a thickness of the nozzle plate between the at least two arrays of nozzles holes to a thickness ranging from about 30 microns to about 60 microns.

In some embodiments, the third photoresist layer is effective to reduce swelling and deformation of the nozzle plate over a period 12 weeks or more in the presence of a solvent.

In some embodiments, the third photoresist layer is effective to reduce delamination of the nozzle plate from a flow feature layer over a period 12 weeks or more in the presence of a solvent.

In some embodiments, the third photoresist layer is disposed adjacent to a fluid supply via area of the nozzle plate.

In some embodiments, the third photoresist layer is laminated to the nozzle plate.

In some embodiments, there is provided a fluid jet ejection head for a fluid ejection device having a nozzle plate that includes at least two arrays of nozzle holes on opposing sides of a fluid supply via etched in an ejection head substrate and a photoresist layer attached to an exposed surface of the nozzle plate spanning a section of the nozzle plate between the at least two arrays of nozzle holes.

An advantage of the nozzle plate structure and methods described herein is that deformation and/or delamination of the nozzle plate from the underlying flow feature layer in the presence of a solvent is greatly reduced, if not substantially eliminated. The reinforcing member increases a thickness of the nozzle plate only in the area of the nozzle plate adjacent to the fluid supply via so that wider fluid supply vias may be used to increase the flow of fluids containing solvents to fluid ejectors on the ejector head substrate. Accordingly, use of a strategically placed reinforcing member eliminates the need for an overall thicker nozzle plate that would affect fluid jet ejection performance, fluid droplet volume, and/or fluid jet ejection velocity. The reinforcing member may also enable the use of a wider ink via than could be used in the absence of the reinforcing member.

DETAILED DESCRIPTION OF EXEMPLARY EMBODIMENTS

The disclosure is directed to improved nozzle plates for fluid jet ejection heads for fluid dispense devices, particularly fluid dispense devices for ejecting fluids containing solvents that can be absorbed by materials of the nozzle plate for the fluid jet ejection heads.

Figure 1:
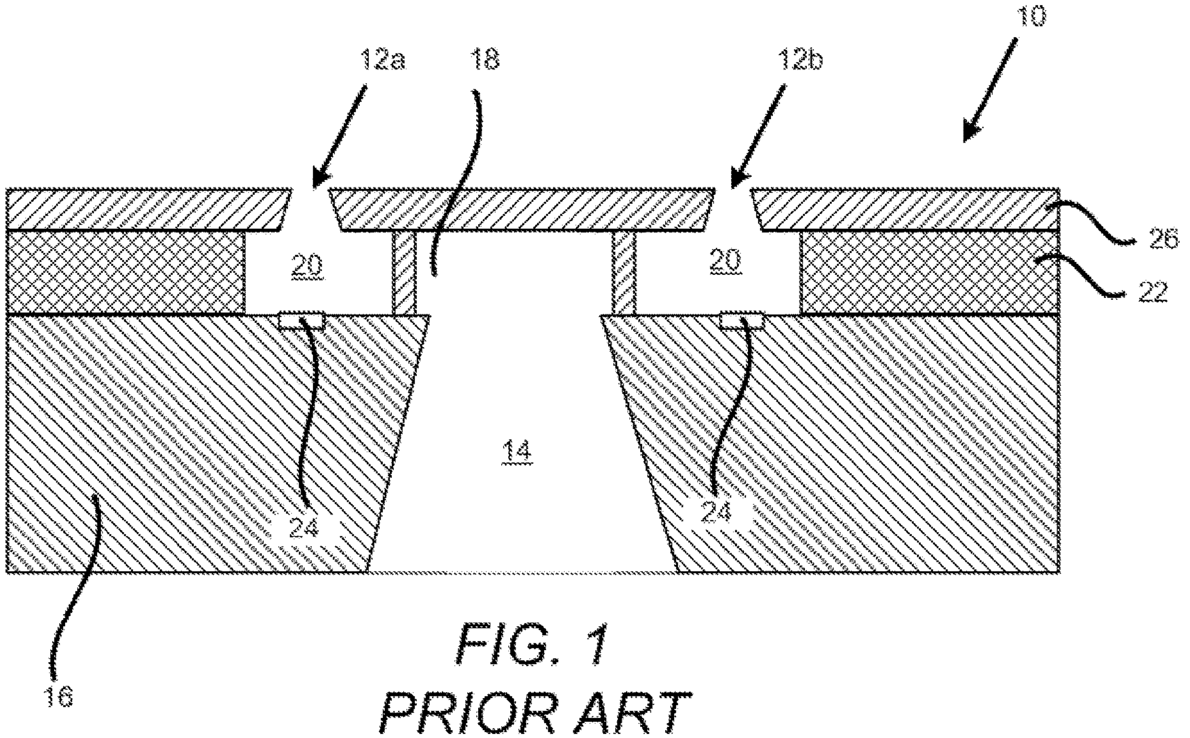
FIG. 1 PRIOR ART
FIG. 1 is a cross-sectional view, not to scale, of a portion of a prior art fluid ejection head.
Figure 2:
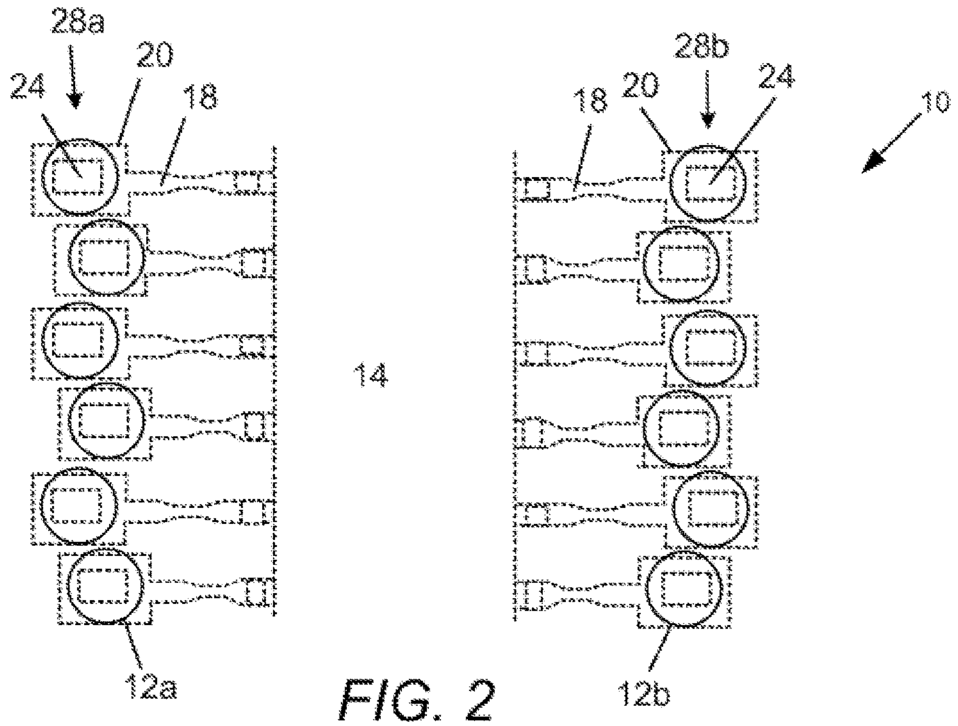
FIG. 2 PRIOR ART
FIG. 2 is a plan schematic view, not to scale, of the portion of the prior art fluid ejection head of FIG. 1.
Figure 3:
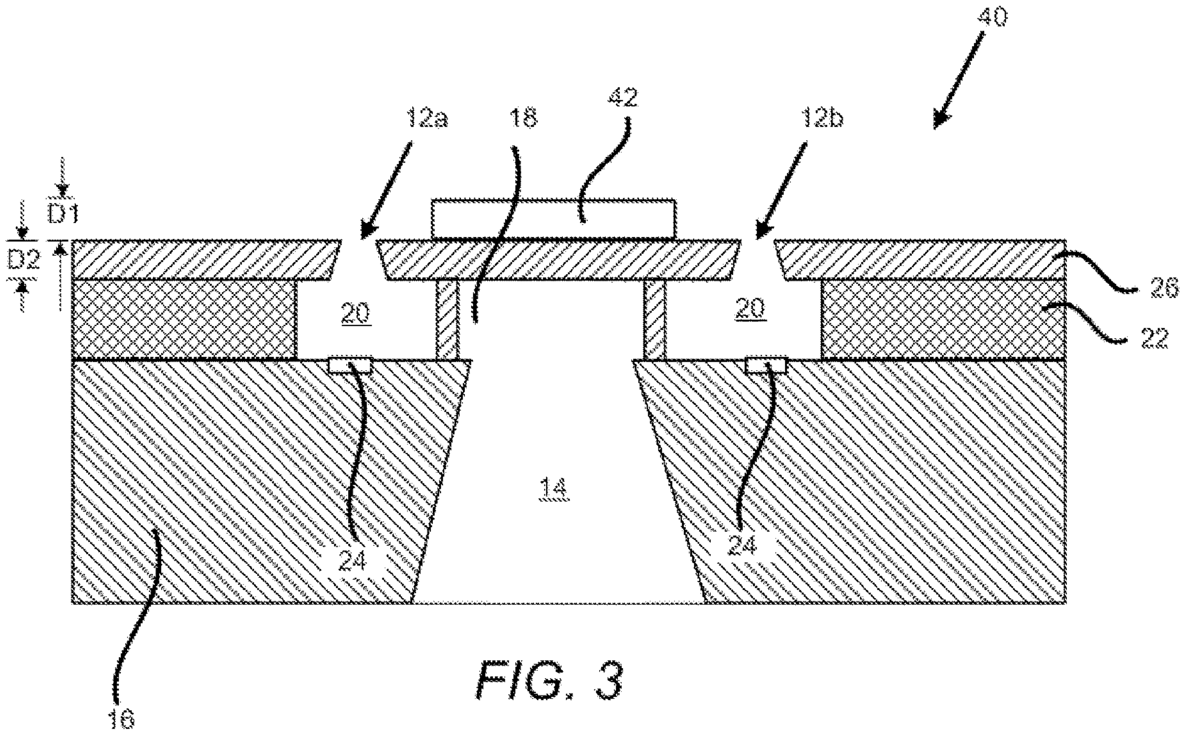
FIG. 3 is a cross-section view, not to scale, of a portion of the fluid ejection head of according to an embodiment of the disclosure.
Figure 4:
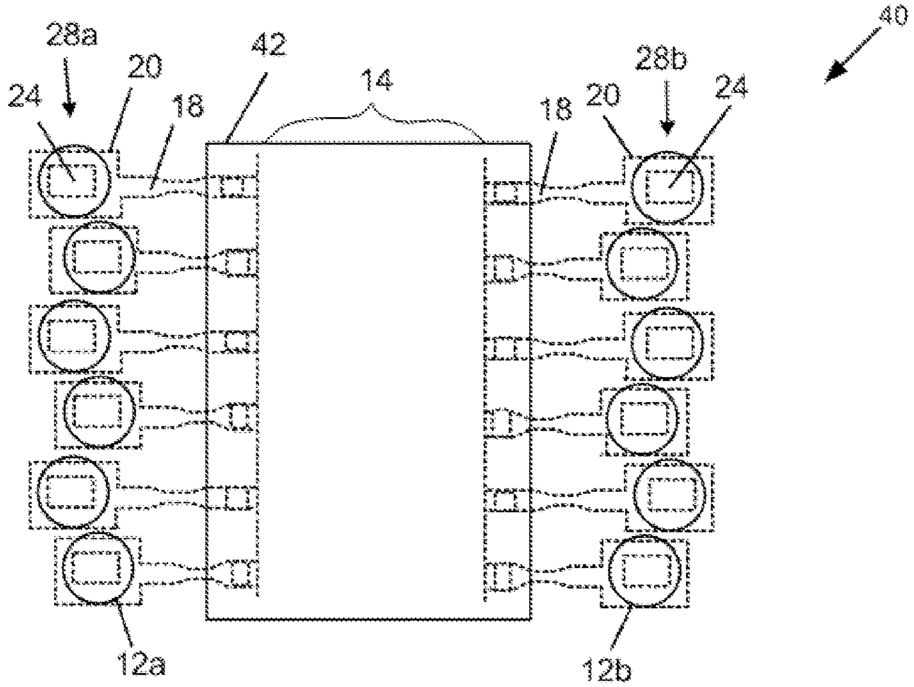
FIG. 4 is a plan schematic view, not to scale, of the portion of the fluid ejection head of FIG. 3.

A portion of the fluid ejection head 40 according to the disclosure is illustrated in a cross-sectional view in FIG. 3 and in a plan view in FIG. 4. The fluid ejection head 40 includes a nozzle plate 26 containing a plurality of fluid ejection nozzles 12*a* and 12*b* disposed along linear arrays 28*a* and 28*b* thereof. Fluid is provided to fluid ejectors 24, such as resistor heaters, from a fluid supply via 14 etched in a semiconductor substrate 16 for providing fluid through flow channels 18 to the fluid ejectors 24 disposed in the fluid chambers 20 as described above.

In order to prevent fluids containing solvents from affecting the dimensional stability of the nozzle plate 26, a reinforcing member 42 is applied to the nozzle plate 26 as shown in FIGS. 3 and 4. The thickness (D1) of the reinforcing member 42 may be the same as the thickness (D2) of the nozzle plate 26, or may be less than the thickness (D2) of the nozzle plate 26. In some embodiments, reinforcing member 42 provides an overall thickness of D1+D2 of greater than 25 microns, such as greater than 30 microns, particularly greater than 35 microns up to about 100 microns or more. In another embodiment, the overall thickness of D1+D2 ranges from about 30 microns to about 60 microns. There is no real upper limit on the overall thickness of D1+D2. However, from a functional point of view, there is no need to increase the overall thickness of D1+D2 to greater than about 100 microns.

Figure 5:
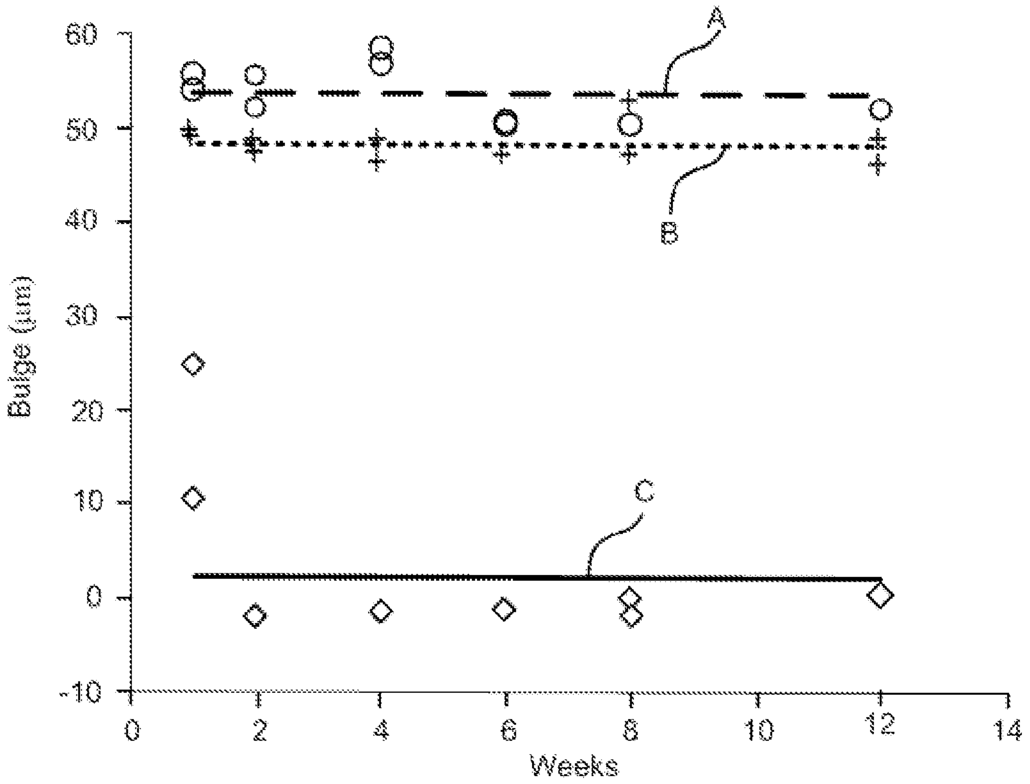
FIGS. 5 and 6 are graphical representations of how a resistance of a prior art nozzle plates to solvents over time varies with nozzle plate thickness.'
Figure 6:
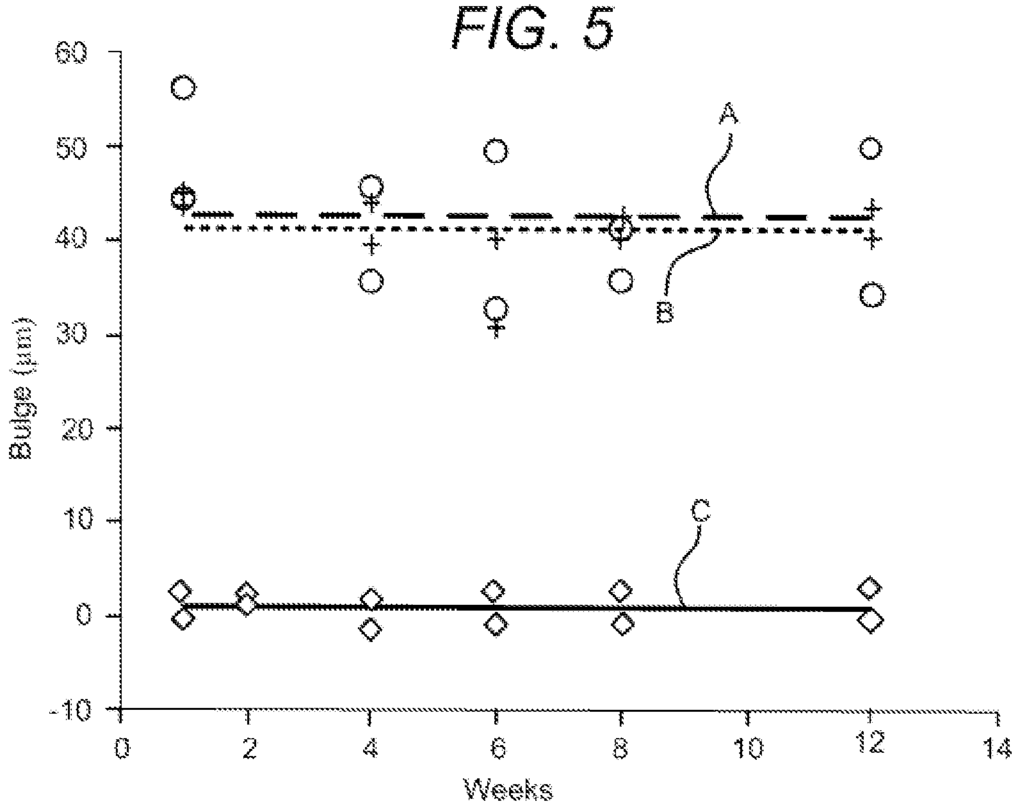
Figure 7:
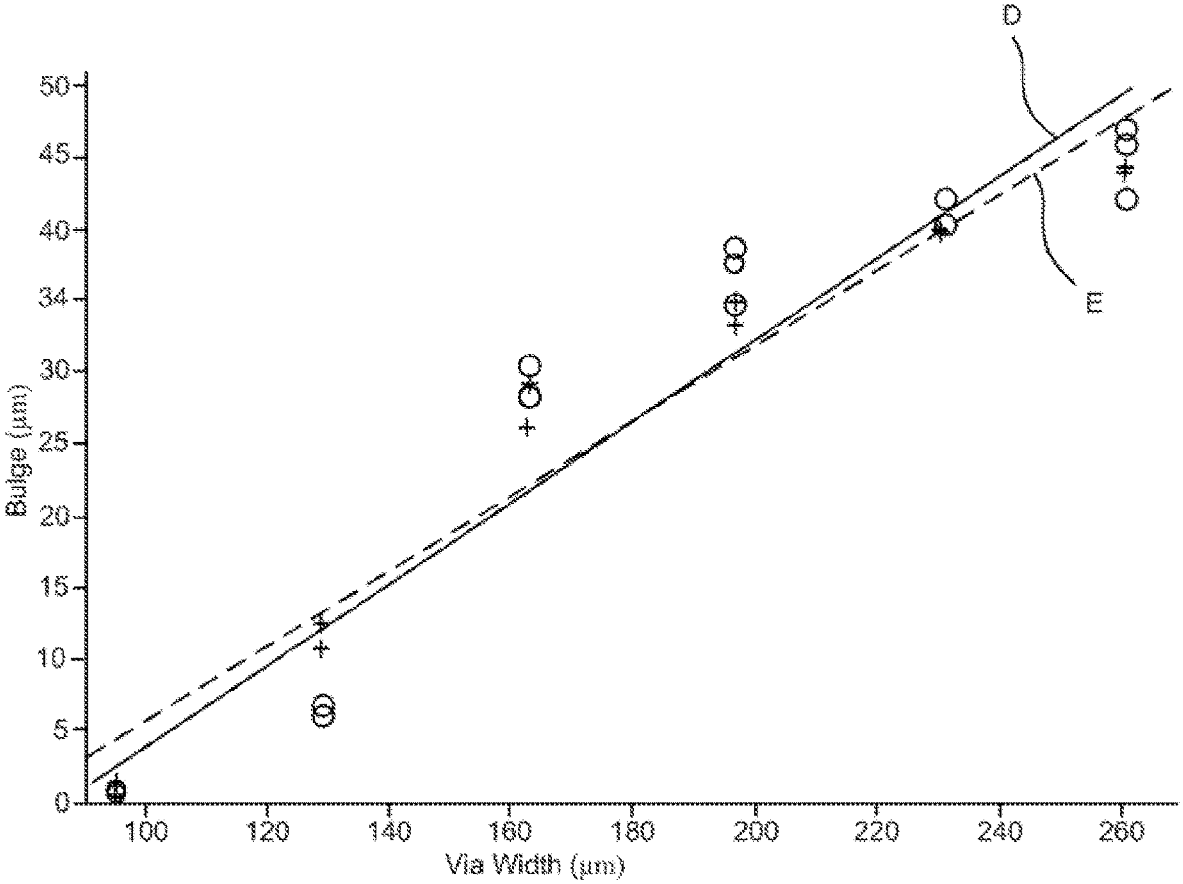
FIG. 7 is a graphical representation of how a width of an ink via affects the resistance of nozzle plates to solvents over a period of 8 weeks exposure to solvents.

As shown in FIGS. 5-7, the thickness (D2) of the nozzle plate 26 and the width of the ink supply via 14 can adversely affect the nozzle plate 26, when the nozzle plate is exposed to solvents such as ethanol and methanol over a prolonged period of time. For example, nozzle plate (A) having a thickness of 17 microns (μm) and nozzle plate (B) having a thickness of 21.5 microns (μm) exhibit a bulge of about 48 microns (μm) over 12 weeks exposure to ethanol (FIG. 5) at 40° C. in the feed via area of the nozzle plate for a feed via width of 235 microns (μm). Whereas a nozzle plate (C) having a thickness of 40 microns (μm) exhibits a bulge of about 2 microns (μm) in the feed via area having the same via width when exposed to ethanol at 40° C. over 12 weeks.

When exposed to methanol (FIG. 6) at 40° C., nozzle plate (A) having a thickness of 17 microns (μm) and nozzle plate (B) having a thickness of 21.5 microns (μm) exhibit a bulge of heads about 42 microns (μm) over 12 weeks exposure to methanol (FIG. 5) at 40° C. in the feed via area of the nozzle plate for a feed via having a width of 235 microns (μm). Whereas a nozzle plate (C) having a thickness of 40 microns (μm) exhibits a bulge of about 1 micron (μm) in the feed via area having the same via width when exposed to methanol at 40° C. over 12 weeks.

As shown in FIG. 7, the bulges of nozzle plates having a thickness of 17 microns (μm) when exposed to ethanol (nozzle plate D) and methanol (nozzle plate E) 40° C. over 8 weeks are substantially linear with respect to the width of the feed via 14. When the width of the feed via 14 is from about 129 to about 163 microns (μm), adhesion loss between the nozzle plates and the underlying fluid flow layer occurs when the nozzle plate is exposed to methanol and ethanol over a prolonged period of time. Accordingly, providing a reinforcing member 42 in the fluid supply via area of the nozzle plate, according to the disclosure is effective to reduce the nozzle plate bulge and subsequent adhesion loss between the nozzle plate and the underlying fluid flow layer. By increasing the thickness of the nozzle plate only in the fluid feed via area of the nozzle plate, wider feed vias 14 may be used without adversely affecting the fluid jetting characteristics from the nozzle plate. As set forth above, wider feed vias 14 may be required in order to increase fluid refill times of the fluid chambers for some fluid dispensing applications.

With reference now to FIGS. 8-12, a method for making an improved ejection head according to embodiments of the disclosure is illustrated. As a first step in the process, a semiconductor substrate 16 containing fluid ejection devices 24 is provided. A first photoresist material layer 44 is applied to a surface 60 of the substrate 16 by conventional methods such as spin coating or laminating the first photoresist material layer 44 to the surface 60 of the substrate 16.

The first photoresist material layer 44 is derived from a first di-functional epoxy compound, a photoacid generator, a non-reactive solvent, and, optionally, an adhesion enhancing agent. In some embodiments of the disclosure, first photoresist material layer 44 includes a multi-functional epoxy compound, a difunctional epoxy compound, a photoacid generator, a non-reactive solvent, and, optionally, an adhesion enhancing agent.

In the photoresist formulations used for making the first photoresist material layer 44, according to embodiments of the disclosure, the difunctional epoxy component may be selected from difunctional epoxy compounds which include diglycidyl ethers of bisphenol-A (e.g. those available under the trade designations "EPON 1007F", "EPON 1007" and "EPON 1009F", available from Shell Chemical Company of Houston, Tex., "DER-331", "DER-332", and "DER-334", available from Dow Chemical Company of Midland, Mich., 3,4-epoxycyclohexylmethyl-3,4-epoxycyclo-hexene carboxylate (e.g. "ERL-4221" available from Union Carbide Corporation of Danbury, Connecticut, 3,4-epoxy-6-methylcyclohexylmethyl-3,4-epoxy-6-methylcy-clohexene carboxylate (e.g. "ERL-4201" available from Union Carbide Corporation), bis(3,4-epoxy-6-methylcyclohexylmethyl) adipate (e.g. "ERL-4289" available from Union Carbide Corporation), and bis(2,3-epoxycyclopentyl) ether (e.g. "ERL-0400" available from Union Carbide Corporation.

A particularly suitable difunctional epoxy component is a bisphenol-A/epichlorohydrin epoxy resin available from Shell Chemical Company of Houston, Tex. under the trade name EPON resin 1007F having an epoxide equivalent of greater than about 1000. An "epoxide equivalent" is the number of grams of resin containing 1 gram-equivalent of epoxide. The weight average molecular weight of the difunctional epoxy component is typically above 2500, e.g., from about 2800 to about 3500 weight average molecular weight in Daltons. The amount of difunctional epoxy component in the photoresist formulation may range from about 30 to about 95 percent by weight based on the weight of the cured resin.

The photoresist formulation according to embodiments of the disclosure also include a photoacid generator. The photoacid generator may be selected from a compound or mixture of compounds capable of generating a cation such as an aromatic complex salt which may be selected from onium salts of a Group VA element, onium salts of a Group VIA element, and aromatic halonium salts. Aromatic complex salts, upon being exposed to ultraviolet radiation or electron beam irradiation, are capable of generating acid moieties which initiate reactions with epoxides. The photoacid generator may be present in the photoresist formulation in an amount ranging from about 0.5 to about 15 weight percent based on the weight of the cured resin.

Examples of triaryl-substituted sulfonium complex salt photoinitiators which may be used in the formulations according to an embodiment of the disclosure include, but are not limited to:

triphenylsulfonium tetrafluoroborate
triphenylsulfonium hexafluorophosphate
triphenylsulfonium hexafluoroantimonate
tritolysulfonium hexafluorophosphate
anisyldiphenylsulfonium hexafluoroantimonate
4-butoxyphenyidiphenylsulfonium tetrafluoroborate
4-chlorophenyidiphenylsulfonium hexafluoroantimonate
4-acetoxy-phenyldiphenylsulfonium tetrafluoroborate
4-acetamidophenyldiphenylsulfonium tetrafluoroborate Of the triaryl-substituted sulfonium complex salts which are suitable for use in the photoresist formulations, the most preferred salt is a mixture of triarylsulfonium hexafluoroantimonate salt, commercially available from Union Carbide Corporation under the trade name CYRACURE UVI-6974.

In another embodiment of the disclosure, the first photoresist formulation also contains the multifunctional epoxy component. A suitable multifunctional epoxy component for making the photoresist formulation according the disclosure, may be selected from aromatic epoxides such as glycidyl ethers of polyphenols. A particularly preferred multifunctional epoxy resin is a polyglycidyl ether of a phenolformaldehyde novolac resin such as a novolac epoxy resin having an epoxide gram equivalent weight ranging from about 190 to about 250 and a viscosity at 130° C. ranging from about 10 to about 60 poise which is available from Resolution Performance Products of Houston, Texas under the trade name EPON RESIN SU-8.

The multi-functional epoxy component of the first photoresist formulation according to the disclosure has a weight average molecular weight of about 3,000 to about 5,000 as determined by gel permeation chromatography, and an average epoxide group functionality of greater than 3, preferably from about 6 to about 10. The amount of multifunctional epoxy resin in the photoresist formulation according preferably ranges from about 30 to about 50 percent by weight based on the weight of the cured layer 44.

The first photoresist formulation described herein may optionally include an effective amount of an adhesion enhancing agent such as a silane compound. Silane compounds that are compatible with the components of the photoresist formulation typically have a functional group capable of reacting with at least one member selected from the group consisting of the multifunctional epoxy compound, the difunctional epoxy compound and the photoinitiator. Such an adhesion enhancing agent may be a silane with an epoxide functional group such as a glycidoxyalkyltrialkoxysilane, e.g., gamma-glycidoxypropyltrimethoxysilane. When used, the adhesion enhancing agent is preferably present in an amount ranging from about 0.5 to about 5 weight percent and preferably from about 0.9 to about 4.5 weight percent based on total weight of the cured resin, including all ranges subsumed therein. Adhesion enhancing agents, as used herein, are defined to mean organic materials soluble in the photoresist composition which assist the film forming and adhesion characteristics of the first photoresist material layer 44 on the surface 60 of the substrate 16.

In order to provide the first photoresist material layer 44 on the surface 60 of the substrate 14 (FIG. 8), a suitable solvent is used. A suitable solvent is a solvent which is preferably non-photoreactive. Non-photoreactive solvents include, but are not limited gamma-butyrolactone, $C_{1-6}$ acetates, tetrahydrofuran, low molecular weight ketones, mixtures thereof and the like. A particularly preferred non-photoreactive solvent is acetophenone. The non-photoreactive solvent is present in the formulation mixtures used to provide the first photoresist material layer 44 in an amount ranging of from about 20 to about 90 weight percent, preferably from about 40 to about 60 weight percent, based on the total weight of the photoresist formulation. The non-photoreactive solvent preferably does not remain in the cured layer 44 and is thus is removed prior to or during the curing steps for layer 44.

According to a preferred procedure, non-photoreactive solvent and difunctional epoxy compound are mixed together in a suitable container such as an amber bottle or flask and the mixture is put in a roller mill overnight at about 60° C. to assure suitable mixing of the components. After mixing the solvent and difunctional epoxy compound, the multifunctional epoxy compound, if used, is added to the container and the resulting mixture is rolled for two hours on a roller mill at about 60° C. The other components, the photoacid generator and the adhesion enhancing agent, are also added one at a time to the container and the container is rolled for about two hours at about 60° C. after adding all of the components to the container to provide a wafer coating mixture.

The photoresist formulations and resulting first photoresist material layer 44 described herein are substantially devoid of acrylate or methacylate polymers and nitrile groups. Without desiring to be bound by theory, it is believed that the higher molecular weight difunctional epoxy material contributes sufficient thermoplastic properties to the layer 44 to enable use of a photocurable formulation that is substantially devoid of acrylate or methacrylate polymers and nitrile rubber components. Additionally, a photoresist formulation, substantially devoid of acrylate or methacrylate polymers, may have an increased shelf life as compared to the same photoresist formulation containing acrylate or methacrylate polymers.

In order to apply the photoresist formulation described above to the surface 60 of the substrate 16 (FIG. 8), a silicon substrate wafer is centered on an appropriate-sized chuck of either a resist spinner or conventional wafer resist deposition track. The first photoresist formulation mixture is either dispensed by hand or mechanically into the center of the wafer. The chuck holding the wafer is then rotated at a predetermined number of revolutions per minute to evenly spread the mixture from the center of the wafer to the edge of the wafer. The rotational speed of the wafer may be adjusted or the viscosity of the coating mixture may be altered to vary the resulting thickness of the layer 44. Rotational speeds of 2500 rpm or more may be used. The amount of photoresist formulation applied to surface 60 of the substrate 16 should be sufficient to provide the layer 44 having the desired thickness for flow features imaged therein. Accordingly, the thickness of layer 44 after curing may range from about 10 to about 25 microns or more.

The resulting silicon substrate wafer containing the layer 44 is then removed from the chuck either manually or mechanically and placed on either a temperature-controlled hotplate or in a temperature-controlled oven at a temperature of about 90° C. for about 30 seconds to about 1 minute until the material is "soft" baked. This step removes at least a portion of the solvent from the layer 44 resulting in a partially dried film on the surface 60 of the substrate 16. The wafer is removed from the heat source and allowed to cool to room temperature.

Prior to imaging and developing the layer 44, the fluid supply via 14 is formed in the substrate 16, such as by an etching process. An exemplary etching process is a dry etch process such as deep reactive ion etching or inductively coupled plasma etching. During the etching process, the layer 44 acts as an etch stop layer.

In order to define flow features in the first photoresist material layer 44 such as a fluid chamber 20 and fluid flow channel 18, the layer 44 is masked with a mask 62 containing substantially transparent areas 64 and substantially opaque areas 66 thereon. Areas of the layer 44 masked by the opaque areas 66 of the mask 62 will be removed upon developing to provide the flow features described above.

Figure 8:
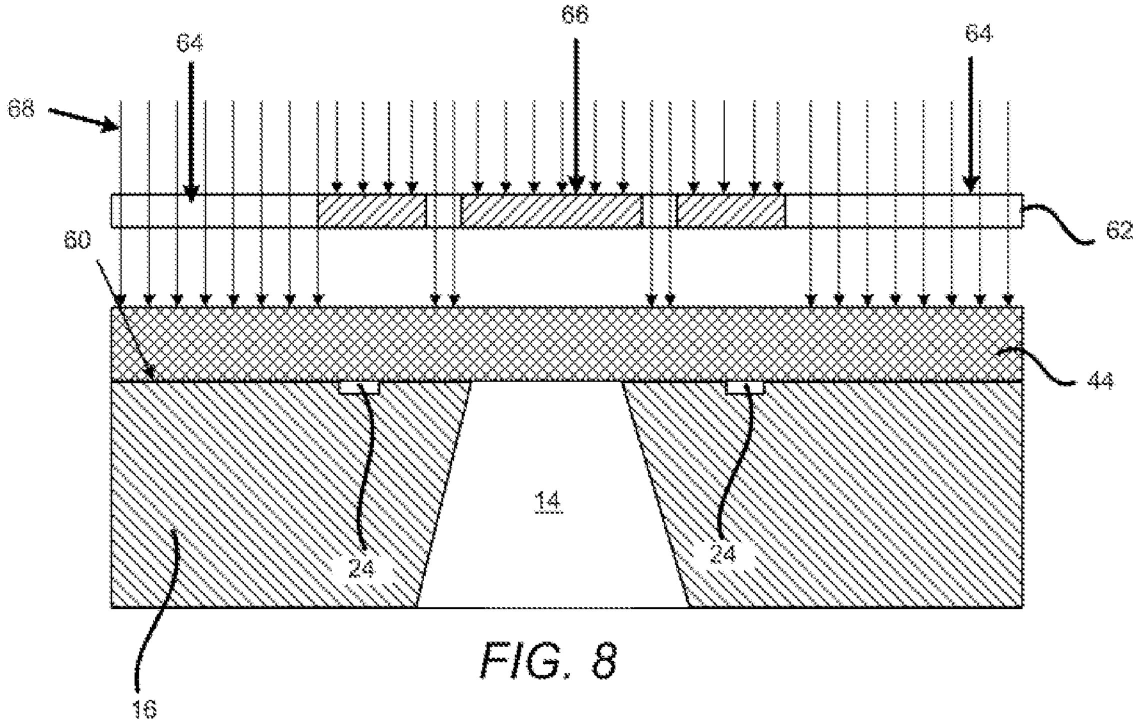
FIGS. 8-12 are cross-section views, not to scale, illustrating steps for making an ejection head according to embodiments of the disclosure.

In FIG. 8, a radiation source provides actinic radiation indicated by arrows 68 to image the layer 44. A suitable source of radiation emits actinic radiation at a wavelength within the ultraviolet and visible spectral regions. Exposure of the layer 44 may be from less than about 1 second to 10 minutes or more, preferably about 5 seconds to about one minute, depending upon the amounts of particular epoxy materials and aromatic complex salts being used in the formulation and depending upon the radiation source, distance from the radiation source, and the thickness of the layer 44. The layer 44 may optionally be exposed to electron beam irradiation instead of ultraviolet radiation.

The foregoing procedure is similar to a standard semiconductor lithographic process. The mask 62 is a clear, flat substrate usually glass or quartz with opaque areas 66 defining the areas to be removed from the layer 44 (i.e., a negative acting photoresist layer). The opaque areas 66 prevent the ultraviolet light from cross-linking the layer 44 masked beneath it. The exposed areas of the layer 44 provided by the substantially transparent areas 64 of the mask 62 are subsequently baked at a temperature of about 90° C. for about 30 seconds to about 10 minutes, preferably from about 1 to about 5 minutes to complete the curing of the layer 44.

Figure 9:
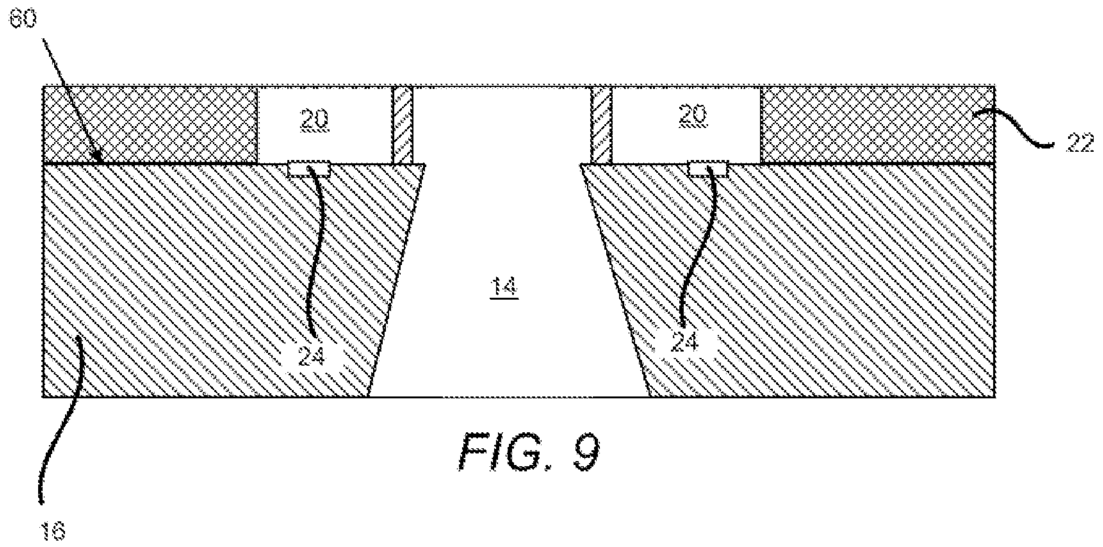

The non-imaged areas of the layer 44 are then solubilized by a developer and the solubilized material is removed leaving the imaged and developed layer 22 on the surface 60 of the substrate 16 as shown in FIG. 9. The developer comes in contact with the substrate 16 and layer 44 through either immersion and agitation in a tank-like setup or by spraying the developer on the substrate 16 and layer 44. Either spray or immersion will adequately remove the non-imaged material. Illustrative developers include, for example, butyl cellosolve acetate, a xylene and butyl cellosolve acetate mixture, and $C_{1-6}$ acetates like butyl acetate.

Exemplary formulations for making the first photoresist material layer 44 are illustrated in the following tables:

TABLE 1

| Component | Amount in cured first layer (wt. %) |
|---|---|
| Difunctional epoxy component (EPON 1007F) | 42.0 |
| 4-phenyl sulfide) phenyl diphenylsulfonium hexafluoroantimonate (CYRACURE 6974) | 15.0 |
| Glycidoxypropyltrimethoxysilane (Z-6040) | 0.93 |
| Acetophenone | 42.07 |

TABLE 2

| Component | Amount in cured first layer (wt. %) |
|---|---|
| Difunctional epoxy component (EPON 1007F) | 20.25 |
| Multifunctional epoxy component (EPON SU-8) | 20.25 |
| Diaryliodoniumhexafluoroantimonate (SARCAT 1012) | 8.9 |
| Glycidoxypropyltrimethoxysilane (Z-6040) | 0.6 |
| Acetophenone | 50.0 |

TABLE 3

| Component | Amount in cured thick film layer (wt. %) |
|---|---|
| Difunctional epoxy component (EPON 1007F) | 44.3 |
| 4-phenyl sulfide) phenyl diphenylsulfonium hexafluoroantimonate (CYRACURE 6974) | 0.9 |
| Glycidoxypropyltrimethoxysilane (Z-6040) | 2.4 |
| Acetophenone | 52.4 |

Figure 10:
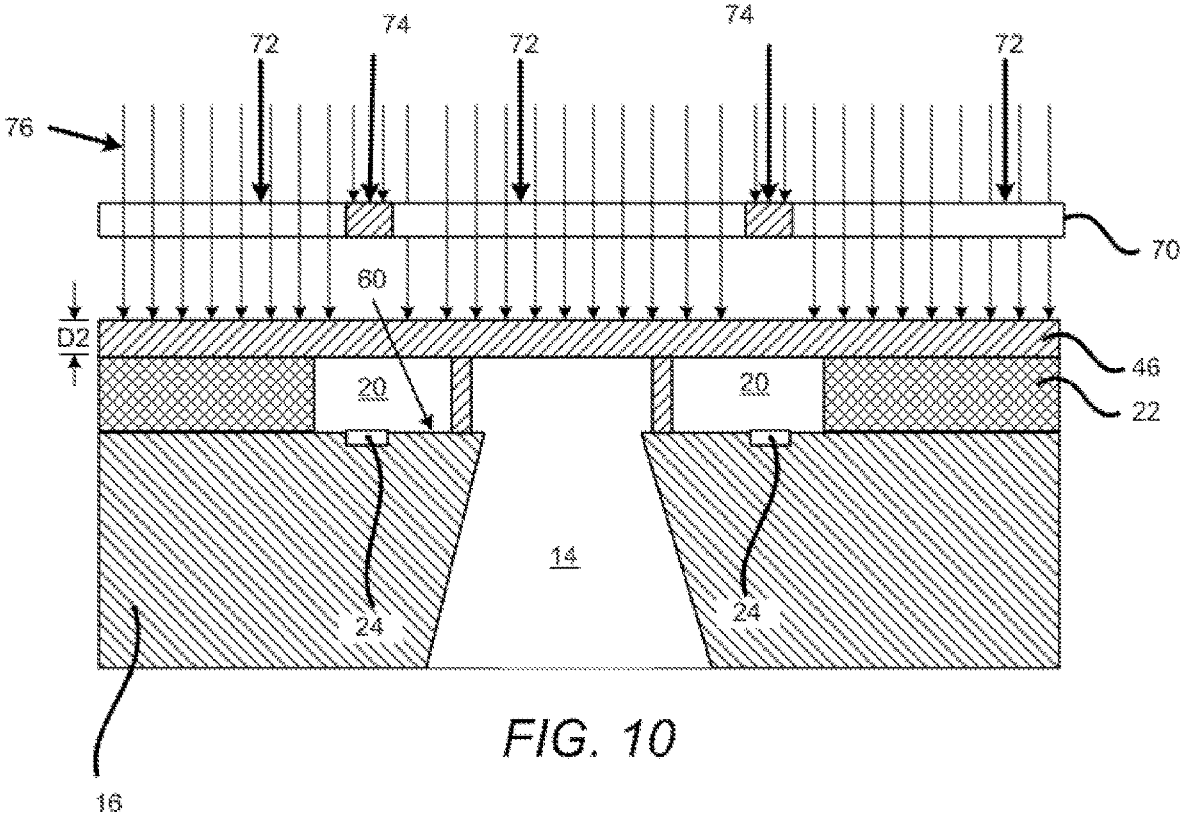

With reference now to FIG. 10, subsequent to imaging and developing the first photoresist material layer 44, a second photoresist material layer 46 providing a nozzle plate layer 26 is laminated to the first layer 22. The second photoresist material layer 46 is provided by a dry film photoresist material derived from a di-functional epoxy compound, a relatively high molecular weight polyhydroxy ether, the photoacid generator described above, and, optionally, the adhesion enhancing agent described above.

The di-functional epoxy compound used for providing the second photoresist material layer 46, includes the first di-functional epoxy compound described above, having a weight average molecular weight typically above 2500 Daltons, e.g., from about 2800 to about 3500 weight average molecular weight in Daltons.

In order to enhance the flexibility of the second photoresist material layer 46 for lamination purposes, a second di-functional epoxy compound may be included in the formulation for the second layer 46. The second di-functional epoxy compound typically has a weight average molecular weight of less than the weight average molecular weight of the first di-functional epoxy compound. In particular, the weight average molecular weight of the second di-functional epoxy compound ranges from about 250 to about 400 Daltons. Substantially equal parts of the first di-functional epoxy compound and the second di-functional epoxy compound are used to make the second photoresist layer 46. A suitable second di-functional epoxy compound may be selected from diglycidyl ethers of bisphenol-A available from DIC Epoxy Company of Japan under the trade name DIC 850-CRP and from Shell Chemical of Houston, Texas under the trade name EPON 828. The total amount of di-functional epoxy compound in the second photoresist material layer 46 ranges from about 40 to about 60 percent by weight based on the total weight of the cured second layer. Of the total amount of di-functional epoxy compound in the second layer 46, about half of the total amount is the first di-functional epoxy compound and about half of the total amount is the second di-functional epoxy compound.

Another component of the second photoresist material layer 46 is a relatively high molecular weight polyhydroxy ether compound of the formula:

$$[OC_6H_4C(CH_3)_2C_6H_4OCH_2CH(OH)CH_2]_n$$

having terminal alpha-glycol groups, wherein n is an integer from about 35 to about 100. Such compounds are made from the same raw materials as epoxy resins, but contain no epoxy groups in the compounds. Such compounds are often referred to as phenoxy resins. Examples of suitable relatively high molecular weight phenoxy resins include, but are not limited to, phenoxy resins available from InChem Corporation of Rock Hill, South Carolina under the trade names PKHP-200 and PKHJ. Such phenoxy compounds have a solids content of about 99 weight percent, a Brookfield viscosity at 25° C. ranging from about 450 to about 800 centipoise, a weight average molecular weight in Daltons ranging from about 50,000 to about 60,000, a specific gravity, fused at 25° C., of about 1.18, and a glass transition temperature of from about 90° to about 95° C.

Phenoxy resins are particularly useful in making the second photoresist layer 46, partially because they often do not crystallize or build up stress concentrations. Phenoxy resins have high temperature characteristics that enable stability over a wide temperature range including temperatures above about 38° C. The second photoresist material layer 46 contains from about 25 to about 35 percent by weight phenoxy resin based on the weight of the cured second layer.

As with the photoresist material for the first layer 44, the second photoresist material layer 46 includes the photoacid generator described above, and, optionally, the adhesion enhancing agent described above. The amount of the photoacid generator ranges from about 15 to about 20 by weight based on the weight of the cured layer 46, and the adhesion enhancing agent, when used, ranges from about 0.05 to about 1 percent by weight based on the weight of the cured second layer 46.

The second photoresist material layer 46 is applied as a dry film laminate to the first photoresist material layer 44 after curing and developing the first layer 44. Accordingly, the foregoing components of the second photoresist material layer 46 may be dissolved in a suitable solvent or mixture of solvents and dried on a release liner or other suitable support material. A solvent in which all of the components of the second photoresist material layer 46 are soluble is an aliphatic ketone solvent or mixture of solvents. A particularly useful aliphatic ketone solvent is cyclohexanone. Cyclohexanone may be used alone or preferably in combination with acetone. Cyclohexanone is used as the primary solvent for the second layer composition due to the solubility of the high molecular weight phenoxy resin in cyclohexanone. Acetone is optionally used as a solvent to aid the film formation process. Since acetone is highly volatile solvent it eludes off quickly after the film has been drawn down onto a release liner or support material. Volatilization of the acetone helps solidify the liquid resin into a dry film for layer. The dry film layer has a thickness D2 ranging from about 10 microns to about 30 microns.

Figure 11:
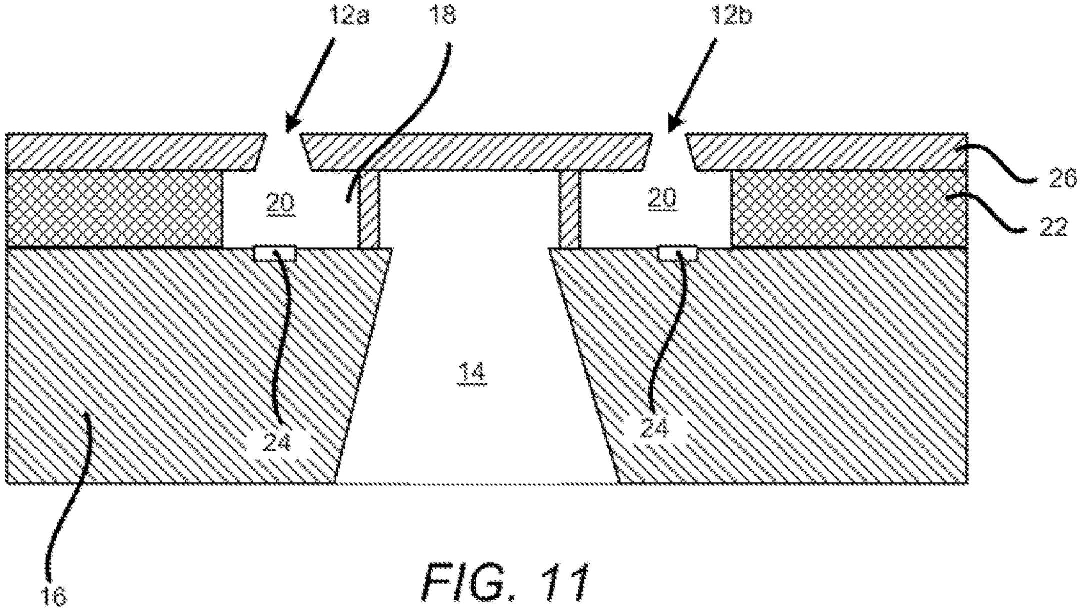

With reference to FIGS. 10 and 11, a method for making an ejection head 40 containing the second photoresist material layer 46 will now be described. According to the method, the second photoresist material layer 46 is imaged and developed according to the procedure used for the first photoresist material layer 44. The second photoresist material layer 46 may be laminated to the first layer 44 using heat and pressure. Next a mask 70 is used to define the nozzle holes 12*a* and 12*b* in the second photoresist layer 46. As described above, the mask 70 includes transparent areas 72 and opaque areas 74 defining the nozzle holes 12*a* and 12*b* in the second layer 46. The opaque areas 74 prevent actinic radiation indicated by arrow 76 from contacting the second layer 46 in an area which will provide the nozzle holes 12*a* and 12*b*, while the remainder of the second layer 46 is cured by the actinic radiation. Upon developing the second photoresist material layer 46 with a suitable solvent as described above, the nozzle holes 12*a* and 12*b* are formed in the second photoresist layer 46 to provide nozzle plate 26 as shown in FIG. 11. Conventional photoimaging and developing techniques as described above are used to image and develop the second photoresist material layer 46.

After developing the second photoresist material layer 46, the substrate 16 containing the flow feature layer 22 and nozzle plate 26 is optionally baked at temperature ranging from about 150° C. to about 200° C., preferably from about from about 170° C. to about 190° C. for about 1 minute to about 60 minutes, preferably from about 15 to about 30 minutes to prevent damage or warping of the nozzle plate 26 during subsequent formation of the reinforcing member 42, described above. The glass transition temperature of the nozzle plate 26 is about 175° C. which is above a dry film lamination temperature used to apply a third photoresist material layer 48 to the nozzle plate 26.

Figure 12:
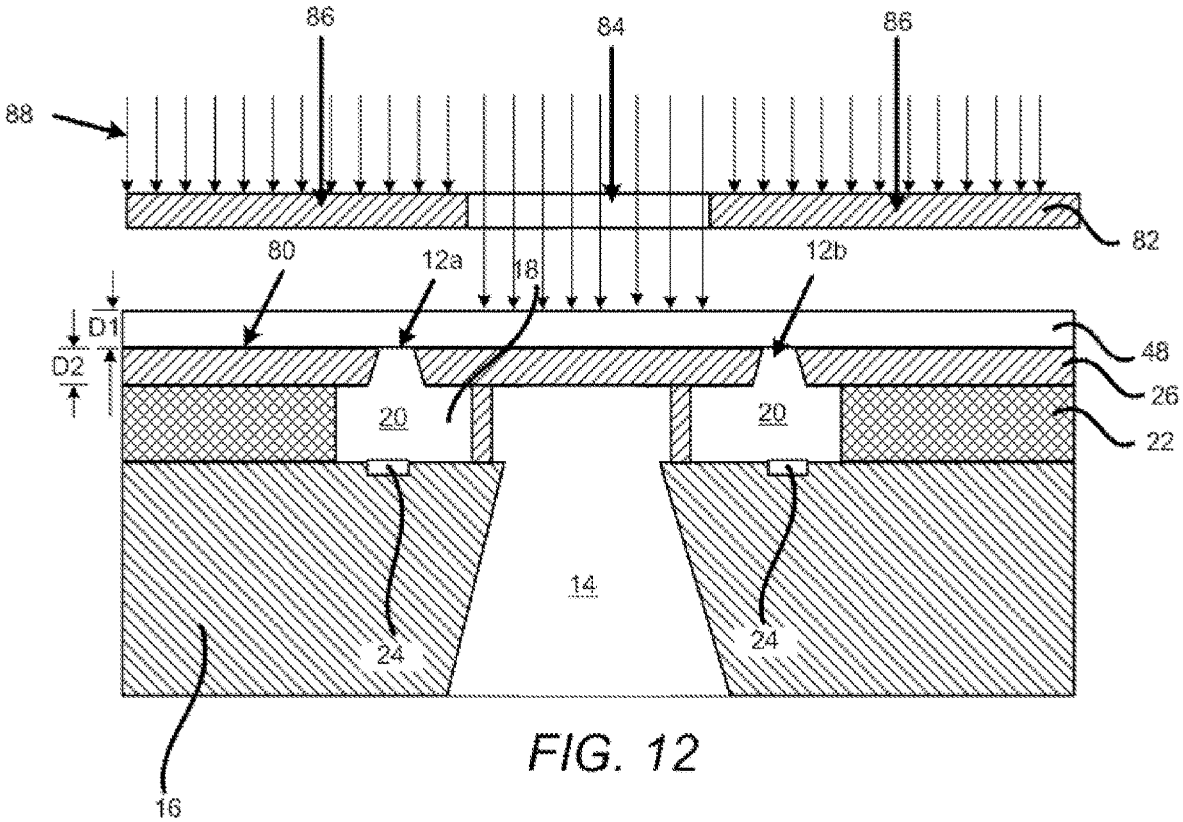

With reference now to FIG. 12, a method for making the reinforcing member 42 is illustrated. Subsequent to imaging and developing and, optionally, baking the second photoresist material layer 46, the third photoresist material layer 48 providing the reinforcing member 42 is laminated to the exterior surface 80 of the nozzle plate 26 as shown in FIG. 12. The third photoresist material layer 48 is provided by a dry film photoresist material of the same formulation described above with respect to the second photoresist material layer 46. Accordingly, the third layer 48 is also derived from a di-functional epoxy compound, a relatively high molecular weight polyhydroxy ether, the photoacid generator described above, and, optionally, the adhesion enhancing agent described above.

A suitable formulation for providing the second and third photoresist material layers 46 and 48 is as follows:

TABLE 4

| Component | Amount in photoresist formulation (wt. %) |
|---|---|
| First di-functional epoxy component (EPON 1007F) | 9.6 |
| Second di-functional epoxy component (DIC 850 CRP) | 9.6 |
| Polyhydroxy ether (InChem PKHJ) | 12.8 |
| Diaryliodoniumhexafluoroantimonate (SARCAT 1012) | 7.2 |
| Glycidoxypropyltrimethoxysilane (Z-6040) | 0.3 |
| Cyclohexanone | 50 |
| Acetone | 10.5 |

The third photoresist material layer 48 is applied as a dry film laminate to the exterior surface 80 of the nozzle plate 26 after curing and developing and, optionally, baking the second layer 26. Accordingly, the foregoing components of the third photoresist material layer 48 may also be dissolved in a suitable solvent or mixture of solvents and dried on a release liner or other suitable support material. A solvent in which all of the components of the second photoresist material layer 48 are soluble is an aliphatic ketone solvent or mixture of solvents. A particularly useful aliphatic ketone solvent is cyclohexanone. Cyclohexanone may be used alone or preferably in combination with acetone. Cyclohexanone is used as the primary solvent for the second layer composition due to the solubility of the high molecular weight phenoxy resin in cyclohexanone. Acetone is optionally used as a solvent to aid the film formation process. Since acetone is highly volatile solvent it eludes off quickly after the film has been drawn down onto a release liner or support material. Volatilization of the acetone helps solidify the liquid resin into a dry film for layer 48.

As described above, the third photoresist material layer 48 may be laminated to the exterior surface 80 of the nozzle plate 26 using heat and pressure at a temperature that is below the glass transition temperature of the nozzle plate 26. The thickness (D1) of the third photoresist material 48 may be the same as the thickness (D2) of the nozzle plate 26 or more be more or less than the thickness (D2) of the nozzle plate 26. In some embodiments, the thickness (D1) of the reinforcing member 42 provided by layer 48 plus the thickness (D2) of the nozzle plate 26 between the at least two arrays of nozzles holes may be greater than 25 microns, and, in some embodiments, may range from about 30 microns to about 60 microns or more. Next a mask 82 is used to define the area of the reinforcing layer 48 that remains on the nozzle plate 26 to reinforce the area of the nozzle plate 26 adjacent to the ink via area 14. The mask 82 includes transparent area 84 defining the reinforcing member 42 and opaque areas 86 defining the portions of the layer 48 that are removed at least over the nozzle holes 12*a* and 12*b*. Opaque areas 86 prevent actinic radiation indicated by arrow 88 from contacting the third layer 48 in an area of the layer 48 to be removed, while the transparent area 84 of the mask 82 enables the actinic radiation to cure the area of the third layer 48 that will remain on the nozzle plate 26. Upon developing the third photoresist material layer 48 with a suitable solvent as described above, the reinforcing member 42 is formed (FIGS. 3-4). Conventional photoimaging and developing techniques as described above are used to image and develop the third photoresist material layer 48.

After developing the third photoresist material layer 48, the substrate 16 containing the layer 22, the nozzle plate 26, and the reinforcing member 42 is optionally baked at temperature ranging from about 150° C. to about 200° C., preferably from about from about 170° C. to about 190° C. for about 1 minute to about 60 minutes, preferably from about 15 to about 30 minutes. A cross sectional view of an ejection head containing the reinforcing member 42 is illustrated in FIG. 3.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

The invention claimed is:

1. A nozzle plate of a fluid jet ejection head for a fluid ejection device, the nozzle plate being configured to attach to an underlying flow feature layer wherein the nozzle plate comprises at least two arrays of nozzle holes on opposing sides of a fluid supply via etched in an ejection head substrate and a photoresist layer attached to an exposed surface of the nozzle plate opposite to the underlying flow feature layer, the photoresist layer spanning a section of the nozzle plate between the at least two arrays of nozzle holes, wherein the photoresist layer is configured to increase a thickness of the nozzle plate between the at least two arrays of nozzle holes to greater than 25 microns up to about 100 microns.

2. The nozzle plate of claim 1, wherein the nozzle plate comprises a first photoimageable layer.

3. The nozzle plate of claim 1, wherein the photoresist layer is configured to increase a thickness of the nozzle plate between the at least two arrays of nozzles holes to a thickness ranging from about 30 microns to about 60 microns.

4. The nozzle plate of claim 1, wherein the photoresist layer is configured to reduce swelling and deformation of the nozzle plate over a period 12 weeks or more in the presence of an ejection fluid containing a solvent.

5. The nozzle plate of claim 1, wherein the photoresist layer is configured to reduce delamination of the nozzle plate from the underlying flow feature layer over a period 12 weeks or more in the presence of an ejection fluid containing a solvent.

6. The nozzle plate of claim 5, wherein the photoresist layer is disposed adjacent to a fluid supply via area of the nozzle plate.

7. The nozzle plate of claim 1, wherein the photoresist layer is laminated to the nozzle plate.

8. A fluid jet ejection head for a fluid ejection device comprising the nozzle plate of claim 1.

9. A method for making an improved fluid ejection head for fluid ejection device, the method comprising the steps of:

applying a first negative photoresist layer to a device surface of a semiconductor substrate, wherein the first negative photoresist layer is derived from a composition comprising a multi-functional epoxy compound, a first di-functional epoxy compound, a photoacid generator, an adhesion enhancer, and an aryl ketone solvent;

imaging and developing the first negative photoresist layer to provide a plurality of flow features therein;

applying a second negative photoresist layer to an exposed surface of the first photoresist layer; the second negative photoresist layer having a thickness ranging from about 10 to about 30 microns and being derived from a second photoresist formulation comprising a second di-functional epoxy compound, a relatively high molecular weight polyhydroxy ether, the photoacid generator, the adhesion enhancer, and an aliphatic ketone solvent;

imaging and developing the second photoresist layer to provide a nozzle plate having at least two arrays of nozzle holes therein on opposing sides of a fluid supply via etched through the semiconductor substrate;

applying a third negative photoresist layer to an exposed surface of the nozzle plate; and imaging and developing the third negative photoresist layer to provide a reinforcing member attached to the nozzle plate, wherein the reinforcing member spans a section of the nozzle plate between the at least two arrays of nozzle holes.

10. The method of claim 9, wherein the nozzle plate comprises a photoimageable layer.

11. The method of claim 9, wherein the reinforcing member increases a thickness of the nozzle plate between the at least two arrays of nozzles holes to a thickness ranging from above 25 microns to about 100 microns.

12. The method of claim 9, wherein the reinforcing member increases a thickness of the nozzle plate between the at least two arrays of nozzles holes to a thickness ranging from above 30 microns to about 60 microns.

13. The method of claim 12, wherein the reinforcing member is configured to reduce swelling and deformation of the nozzle plate over a period 12 weeks or more in the presence of an ejection fluid containing a solvent.

14. The method of claim 12, wherein the reinforcing member is configured to reduce delamination of the nozzle plate from the first negative photoresist layer over a period 12 weeks or more in the presence of an ejection fluid containing a solvent.

15. The method of claim 9, wherein the reinforcing member is disposed adjacent to a fluid supply via area of the nozzle plate.

16. The method of claim 15, wherein the third negative photoresist layer is laminated to the nozzle plate.

* * * * *